United States Patent
Serebrin (10) Patent No.: US 9,778,949 B2
(45) Date of Patent: Oct. 3, 2017

(54) THREAD WAITING IN A MULTITHREADED PROCESSOR ARCHITECTURE

(71) Applicant: Google Inc., Mountain View, CA (US)

(72) Inventor: Benjamin C. Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/269,779

(22) Filed: May 5, 2014

(65) Prior Publication Data

US 2015/0317182 A1 Nov. 5, 2015

(51) Int. Cl.
| | | |
|---|---|---|
| G06F 9/46 | (2006.01) | |
| G06F 9/38 | (2006.01) | |
| G06F 12/0842 | (2016.01) | |
| G06F 12/0813 | (2016.01) | |
| G06F 13/24 | (2006.01) | |

(52) U.S. Cl.
CPC ............ G06F 9/467 (2013.01); G06F 9/3834 (2013.01); G06F 9/3851 (2013.01); G06F 12/0813 (2013.01); G06F 12/0842 (2013.01); G06F 13/24 (2013.01)

(58) Field of Classification Search
CPC ....... G06F 9/467; G06F 9/3834; G06F 9/3851
See application file for complete search history.

(56) References Cited

U.S. PATENT DOCUMENTS

| | | | |
|---|---|---|---|
| 8,375,175 B2 | 2/2013 | Dice et al. | |
| 8,539,168 B2 | 9/2013 | Dice et al. | |
| 8,543,775 B2 | 9/2013 | Chung et al. | |
| 8,627,017 B2 | 1/2014 | Sheaffer et al. | |
| 2004/0117604 A1* | 6/2004 | Marr | G06F 9/30083 712/226 |
| 2004/0187123 A1* | 9/2004 | Tremblay | G06F 9/467 718/100 |

(Continued)

FOREIGN PATENT DOCUMENTS

WO 2004/075046 9/2004

OTHER PUBLICATIONS

International Search Report and Written Opinion in International Application No. PCT/US2015/029051, mailed Jul. 21, 2015, 9 pages.

(Continued)

*Primary Examiner* — Edward Dudek, Jr.
(74) *Attorney, Agent, or Firm* — Fish & Richardson P.C.

(57) ABSTRACT

Methods, systems, and apparatus, including computer programs encoded on computer storage media, for thread waiting. One of the methods includes starting, by a first thread on a processing core, a task by starting to execute a plurality of task instructions; initiating, by the first thread, an atomic memory transaction using a transactional memory system, including: specifying, to the transactional memory system, at least a first memory address for the atomic memory transaction and temporarily ceasing the task by not proceeding to execute the task instructions; receiving, by the first thread, a signal as a consequence of a second thread accessing the first memory address specified for the atomic memory transaction; and as a consequence of receiving the signal, resuming the task, by the first thread, and continuing to execute the task instructions.

19 Claims, 4 Drawing Sheets

(56) References Cited

U.S. PATENT DOCUMENTS

| | | | |
|---|---|---|---|
| 2007/0240158 A1* | 10/2007 | Chaudhry | G06F 9/52 |
| | | | 718/102 |
| 2010/0023703 A1 | 1/2010 | Christie et al. | |
| 2010/0162247 A1* | 6/2010 | Welc | G06F 9/466 |
| | | | 718/101 |
| 2010/0332753 A1* | 12/2010 | Gray | G06F 12/0831 |
| | | | 711/118 |
| 2011/0296114 A1 | 12/2011 | Farrell et al. | |
| 2011/0296148 A1* | 12/2011 | Cain, III | G06F 9/30087 |
| | | | 712/228 |
| 2013/0326153 A1 | 12/2013 | Rozas | |
| 2014/0040567 A1 | 2/2014 | Pohlack et al. | |

OTHER PUBLICATIONS

International Preliminary Report on Patentability in International Application No. PCT/US2015/029051, mailed on Nov. 17, 2016, 7 pages (no new art).

\* cited by examiner

THREAD WAITING IN A MULTITHREADED PROCESSOR ARCHITECTURE

BACKGROUND

This specification relates to processor architectures.

Some processor architectures can execute multiple independent threads, e.g., multithreading. In some cases, it is desirable for a thread to wait on an input/output (IO) or synchronization operation rather than yielding the thread to a processing core by context switching another thread on the processor core. To accomplish this, software can implement busy polling or spin polling on one or more memory addresses, e.g., spinlock-based synchronization. While busy polling on memory addresses could result in advantageous latency by avoiding context switching overheads, it inevitably results in wasted execution resources. For example, with single-threaded processing cores or hyperthreaded processing cores that lack any hardware thread switching capability, the processing cores could go unused for real work during busy polling, which may waste resources of other hyperthreads on the processing cores. Moreover, if a number of memory addresses being polled is numerous, it may cause additional latency.

SUMMARY

This specification describes a technology that uses atomic memory transactions in waiting threads to monitor multiple memory addresses, quickly resume the waiting threads, and minimize impact of the waiting threads on other concurrent threads sharing a multithreaded processor architecture.

In general, one innovative aspect of the subject matter described in this specification can be embodied in methods that include the actions of starting, by a first thread on a processing core, a task by starting to execute a plurality of task instructions; initiating, by the first thread, an atomic memory transaction using a transactional memory system, including: specifying, to the transactional memory system, at least a first memory address for the atomic memory transaction and temporarily ceasing the task by not proceeding to execute the task instructions; receiving, by the first thread, a signal as a consequence of a second thread accessing the first memory address specified for the atomic memory transaction; and as a consequence of receiving the signal, resuming the task, by the first thread, and continuing to execute the task instructions.

In another general embodiment, a method includes the actions of initiating an atomic memory transaction in a first thread while executing a second thread; aborting the transaction as a consequence of determining that at least one memory address specified for the transaction is accessed by a thread other than the first thread; and executing task instructions in the first thread as a consequence of aborting the transaction.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. For instance, specifying the first memory address for the atomic memory transaction includes specifying a plurality of memory addresses for the atomic memory transaction, the plurality of memory addresses corresponding to a plurality of cache lines of a cache memory coupled to the processing core. Specifying a plurality of memory addresses for the atomic memory transaction includes executing a load instruction from each memory address of the plurality of memory addresses. The features further include, for each memory address of the plurality of memory addresses, storing a head pointer of a plurality of head pointers at the memory address, each head pointer specifying a respective queue of a plurality of queues, and the signal comprises an update signal for updating a specific head pointer stored in the specific memory address.

The features further include executing one or more instructions in the transaction after specifying the first memory address for the atomic memory transaction, and the one or more instructions in the transaction comprise a loop configured to consume very few resources of the processing core for execution. Temporarily ceasing the task includes executing a low yield instruction once or repeatedly. The low yield instruction includes one or more of: a memory fence instruction, a no operation (NOP) instruction, or a timestamp checking instruction. The transactional memory system includes a hardware transactional memory (HTM) system configured to interrupt any thread having specified a transaction memory address accessed by a different thread. The signal is received from a second, different device executing the second thread, and the processing core and the second device are coupled to a shared memory including the first memory address. The processing core is coupled to a first main memory in a first processing system, and the first memory address specifies a memory location in the first main memory, and receiving a signal includes receiving the signal from a second, different processing system configured to read data directly from a second, different main memory in the second processing system and write the data directly to the first memory address in the first main memory.

Particular embodiments of the subject matter described in this specification can be implemented to realize one or more advantages. First, users can use transactions to build a lightweight user-mode notification for device or threads to resume or reactivate waiting threads during multithreading; second, using transactions can quickly put threads in waiting conditions and quickly resume the waiting threads for execution; third, transactions can minimize waiting threads' impact on other concurrent threads that share same processing cores; fourth, transactions can simultaneously monitor multiple memory addresses, e.g., multiple cache lines or queues, that waiting threads are interested in, e.g., in applications such as mutex code, remote direct memory access (RDMA), OS-bypass, NIC-offload, or nonvolatile, byte-addressable storage controllers; fifth, waiting threads executed on one processing system can be remotely controlled, e.g., reactivated, by another processing system; sixth, device drivers of operating systems can use transactions to optimize spin loops on multiple high performance queues or optimize user code in complex multithreaded systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
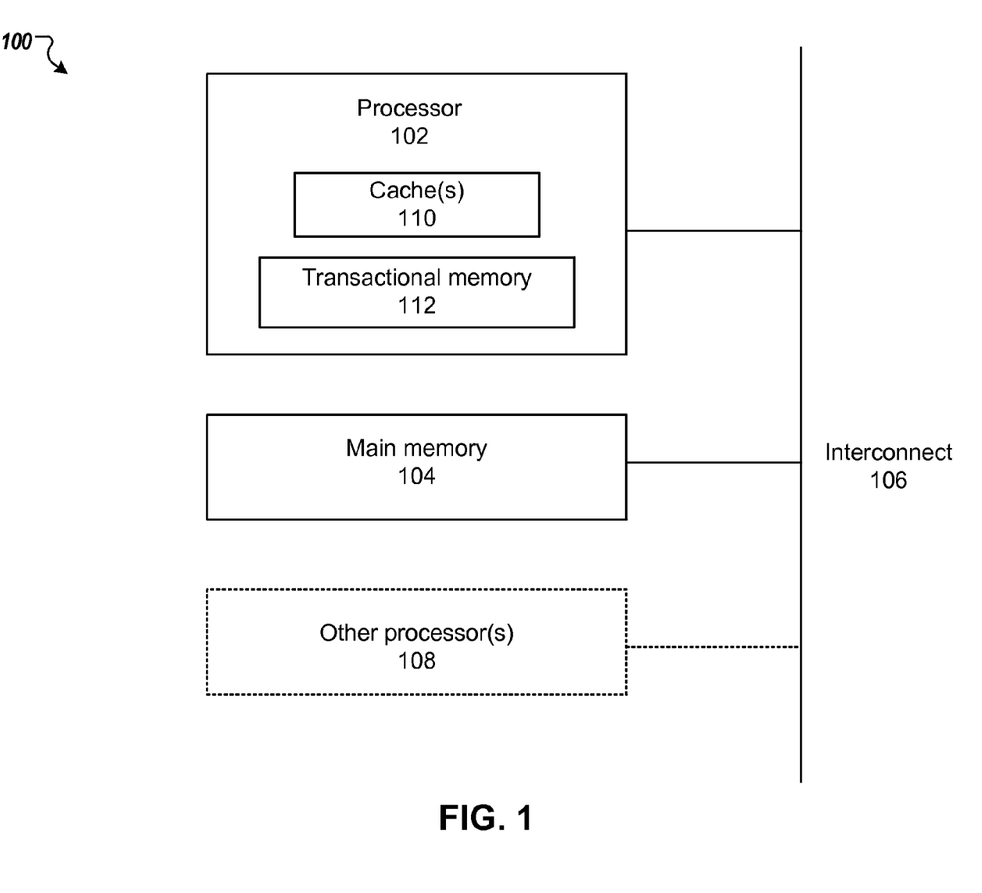
FIG. 1 is a block diagram of an example multithreaded processing system with transactional memory system.

FIG. 1 is a block diagram of an example multithreaded processing system 100. The multithreaded processing system 100 can concurrently execute a number of threads. Waiting threads can execute atomic memory transactions during waiting periods and be quickly reactivated by other threads or devices for execution.

The multithreaded processing system 100 includes a processor 102. The processor 102 may be a physical or logical processing core configured to execute computer program instructions. The processor 102 is coupled to a main memory 104, e.g., one or more random-access memory (RAM) chips, over an interconnect 106. The interconnect 106 may include a shared system bus or a point-to-point network in various topologies.

In some implementations, the multithreaded processing system 100 includes one or more other processors 108 coupled to the main memory 104 over the interconnect 106. The processors 108 may be physical or logical processing cores. The processor 102 and the processors 108 can have a shared memory, e.g., the main memory 104, for multithreading, e.g., simultaneous multithreading (SMT). In some implementations, the processor 102 and the processors 108 are on a dedicated chip. In some implementations, the processor 102 and the processors 108 are on a multi-processor chip and can be connected by an on-chip network.

The processor 102 may include one or more local caches 110. The caches 110 can cache data from the main memory 104, e.g., store local copies of values stored in the main memory 104, for quick access by the processor 102. In some implementations, the processor 102 includes one or more levels of caches. Levels of caches may be hierarchically arranged, e.g., L1 cache, L2 cache, and L3 cache. In a particular example, the processor 102 includes a lower level cache, e.g., an eight-way L1 cache, and is coupled to the main memory 104 through a higher level cache, e.g., an L3 cache, that is shared with the other processors 108. In some implementations, the processor 102 is coupled to the caches 110.

The multithreaded processing system 100 includes a transactional memory system 112. In some implementations, the transactional memory system 112 is a component of the processor 102, as illustrated in FIG. 1. Each of the processors 108 can also include a transactional memory system that has substantially identical properties to the transactional memory system 112. In some implementations, the transactional memory system 112 is coupled to the processor 102 and the processors 108, e.g., over the interconnect 106. In some implementations, the transactional memory system 112 is included in the caches 110.

The transactional memory system 112 may be implemented in hardware transactional memory (HTM), software transactional memory (STM), or a combination thereof. In some implementations, the transactional memory system 112 is implemented as one or more physical memory devices and a series of instructions executable by the processor. For example, the processor 102 may be INTEL's Haswell processor microarchitecture that supports limited hardware transactions.

The transactional memory system can be configured to detect and/or to execute regions of code as atomic and/or isolated transactions. For example, with the transactional memory system 112, programmers may declare a group of instructions as being part of a region and the transactional memory system 112 may guarantee that the instructions in the region are executed as an atomic and/or isolated transaction. All the instructions of the transaction can be executed as a single atomic block on a processor, e.g., the processor 102, with respect to all other concurrent threads of execution on one or more other processing cores, e.g., the processors 108 in the multithreaded processing system 100. In some cases, no intermediate result of the transaction can be exposed to the rest of the system 100 until the transaction completes.

An atomic memory transaction may include specific instructions, e.g., memory access, e.g., read and/or write operations to a shared memory, e.g., the main memory 104, and/or to some other memory areas. The main memory 104 may be concurrently accessible by one or more other threads in the system 100. During the transaction, memory addresses in the main memory 104 that the processor 102 has read or loaded data from may be referred to a read set, and memory addresses in the main memory 104 that the processor 102 has written or stored data to may be referred to a write set. The cache 110 in the processor 102 can be used to hold data from the read set and/or to the write set and have memory areas corresponding to the read set and/or the write set.

The transactional memory system 112 may keep track of which memory areas have been read from and/or written to, e.g., a read set and/or write set, during execution of a transaction. In some implementations, the transactional memory system 112 marks an entire cache line in which data resides as being in a read or write set of a transaction. The cache line may hold multiple different addressable data.

The transactional memory system 112 can allow an atomic memory transaction to run as long as conditions for the transaction are maintained. If one or more conditions of the transaction have been violated, the transaction aborts. In some examples, transactions are aborted at any point because of contention with other processors, far control transfers, e.g., those caused by interrupt and faults, execution of explicit software ABORT instructions, insufficient hardware resources, or other implementation-specific conditions. The transactional memory system 112 may provide one or more instructions to the system 100 to protect one or more memory addresses or cache lines specified for the transaction. The transactional memory system 112 ensures that accesses to protected memory occur atomically with respect to all other concurrently executing threads in the system 100. In some implementations, the transactional memory system 112 includes an extension, e.g., transactional synchronization extensions (TSX), to one or more of the system's caches, e.g., the cache 110, to indicate which cache lines are protected.

The transactional memory system 112 can track memory addresses specified for a transaction in a thread, e.g., addresses of protected cache lines, and determine whether a violation occurs for the transaction. In some examples, the transactional memory system 112 determines whether one or more memory addresses specified for the transaction have been accessed by an external agent, e.g., a different processor in the system 100 executing another thread or a different processing system.

If the transactional memory system 112 determines that the specified memory addresses have been accessed by the external agent, the transactional memory system 112 may determine to abort the transaction. In some examples, the transactional memory system 112 may receive a signal that indicates an access to the specified memory addresses and determine to abort the transaction as a consequence of receiving the signal, e.g., automatically. The transactional memory system 112 can be configured to take an action on, e.g., redirect, any thread having specified a transaction memory address accessed by a different thread.

In a particular example, a thread executes an atomic transaction on the processor 102. A read set and/or a write set have been specified for the transaction. If one of the processors 108 writes data to the read set or reads or writes data to or from the write set, the transactional memory system 112 determines that the read set or the write set specified for the transaction on the processor 102 has been accessed by the one of the processors 108, and further determines to abort the transaction.

The transactional memory system 112 may include a cache coherence communication protocol among the interconnected processors, e.g., the processor 102 and the processors 108, to ensure that values contained in caches of each processor are coherent with values stored in the share memory, e.g., the main memory 106. Each processor may include various cache coherence mechanisms that may include facilities to exchange cache coherence messages with other processing cores, e.g., MESIF (modified, exclusive, shared, invalid, forward) protocol messages, MESI protocol messages, and/or to perform synchronization functions.

In some examples, when a thread on one of the processors 108 accesses one or more memory addresses for a thread on the processor 102, a transactional memory system on the one of the processors 108 may send a signal to the transactional memory system 112. After receiving the signal, the transactional memory system 112 may determine to abort the thread on the processor 102. In some cases, a device, e.g., a non-core device, may send an abort signal to the transactional memory system 112.

In some examples, after the transaction in the thread is aborted, the transactional memory system 112 may allow the processor 102 to continue executing the thread. For example, the processor 102 can jump to instruction addresses, e.g., cache lines in the cache 110, specified for the transaction, and continue execution of instructions (other than the transaction) in the thread. As noted above and discussed in further detail below, this can be used to quickly pull back or resume a waiting thread to a pipeline of the processor.

In some implementations, a processor, e.g., the processor 102, in a multithreading processing system, e.g., the multithreading processing system 100, is executing a plurality of threads. A first thread includes instructions of a task and an atomic memory transaction. The processor may start the task in the first thread by starting to execute a plurality of task instructions. At a first time point, the first thread may enter into a waiting condition and/or a second thread can be executing on the processor. The processor can temporarily cease the task by not proceeding to execute the task instructions.

The processor can initiate the atomic memory transaction in the first thread. The processor can specify at least one memory address for the atomic memory transaction to a transactional memory system, e.g., the transactional memory system 112 in the system 100. In some cases, the processor can specify a plurality of memory addresses for the atomic memory transaction. The plurality of memory addresses can correspond to a plurality of cache lines of a cache memory, e.g., the cache 110, coupled to or included in the processor.

In some implementations, after specifying the one or more memory addresses for the transaction, the processor may execute one or more instructions in the transaction. In some examples, the transaction includes a loop configured to consume very few resources of the processor and/or the system for execution. In some examples, the processor may execute a low yield instruction, e.g., once or repeatedly, that consumes very few resources of the processor and/or the system for execution. The low yield instruction can be one or more of a no operation (NOP) instruction, a memory fence instruction, or a timestamp checking instruction.

For example, the memory fence instruction sequence can be:

```
while (1)
    mfence ( );
```

The timestamp checking instruction can be:

```
while (rdtsc( ) < timeout) {
    mfence ( );
}
xabort ( );
```

In some implementations, the transaction may include an mwait instruction, e.g., by changing instruction set architecture (ISA) in the transactional memory system. The mwait instruction can be specified at one of a plurality of cache lines in a read set. When the first thread executes the mwait instruction during the waiting period, the processor can deallocate or reschedule execution resources from the first thread and lets the other concurrent threads, e.g., the second thread, use the resources.

In some implementations, the transaction can be augmented to indicate a target power state. The low yield instruction in the transaction can minimally include both timeout and specified power state. In some cases, the low yield instruction can include indications of a sequence of power states to enter over time. For example, a thread may stay in a high-power state for 10 microseconds to enable quickly-arriving events to be handled very quickly, and then find a better overall energy tradeoff by going to a mid-power state for 100 more microseconds, and then finally go to a deeper sleep state to save energy while long-duration events percolate through the system.

At a second time point after the first time point, the system may resume or reactivate the first thread. The processor may receive a signal, e.g., an event signal or an abort signal, as a consequence of an external agent, e.g., one of the other processors 108 or a non-core device, accessing one of the memory addresses specified for the atomic memory transaction. As a consequence of receiving the signal, the processor may resume the task in the first thread and/or complete execution of the task instructions. In some cases, the signal can abort the transaction immediately and the processor can quickly resume the first thread for execution.

In some examples, the transaction in the first thread may include an instruction that yields execution resources for a specified and limited number of cycles. The cycles can include fetch-and-execute cycles or fetch-decode-execute cycles (FDXs). Any writes to a read set specified for the transaction may abort the transaction immediately, disregarding the remaining yield cycles. In such cases, the transaction can minimize impact of the first thread on other concurrent threads, e.g., the second thread, sharing the processor, and can also retain quick reactivating speed for the first thread.

In some examples, a plurality of head pointers, e.g., h, of a plurality of respective queues are stored in a plurality of memory addresses, e.g., H, H', H", etc. Each head pointer is stored in a respective memory address. The processor can execute a load instruction from each memory address of a plurality of memory addresses. In such cases, the transaction can be used to monitor the plurality of queues. The signal can include an update signal for updating a specific head pointer stored in a memory address specified for the transaction.

In a particular example, the waiting thread's code can be:

```
xbegin (abort_label);
for_each_queue (h in H, H', H". . .)
    {
        load (h);
    }
spin ( );
xend;
abort_label:
handleUpdatedQueues( );
```

The spin instruction can include a low yield instruction as noted above. The instruction at the abort_label can be an instruction to execute as a consequence of receiving a transaction abort signal.

Figure 2A:
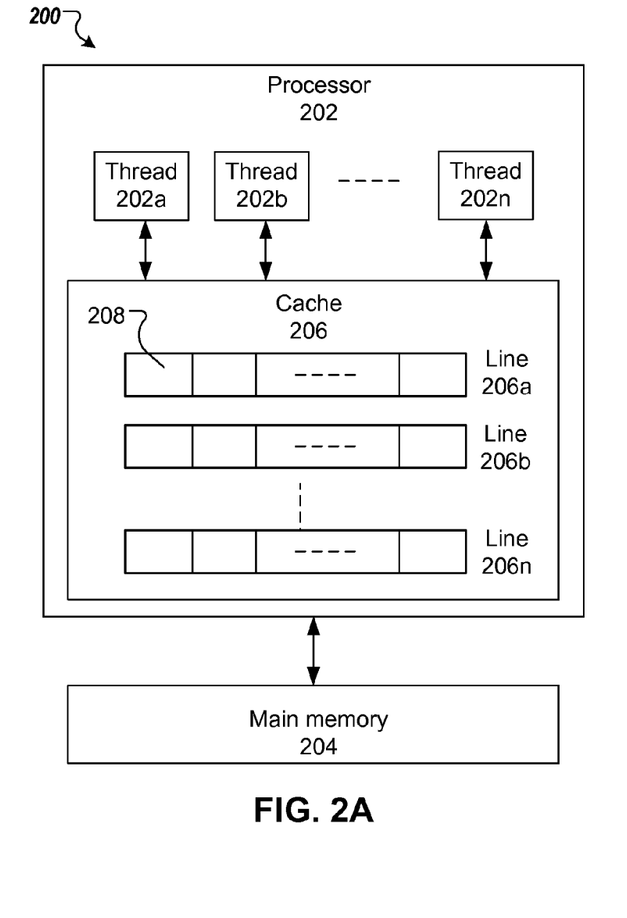
FIG. 2A is a block diagram of an example multithreaded processing system for executing multiple threads.

FIG. 2A is a block diagram of an example multithreaded processing system 200 for executing multiple threads. The multithreaded processing system 200 can be the multithreaded processing system 100 of FIG. 1. The system 200 can include a processor 202, e.g., the processor 102 of FIG. 1, to execute multiple threads 202a, 202b, . . . , 202n. The processor 202 can include a cache 206, e.g., the cache 110 of FIG. 1. The processor 202 is coupled to a main memory 204, e.g., the main memory 104 of FIG. 1.

When the processor 202 executes a thread, the processor 202 may read or load data from one or more memory addresses in the main memory 204 and cache the data in one or more corresponding memory addresses 208 in the cache 206. The processor 202 may write or store data from one or more memory addresses 208 in the cache 206 to one or more corresponding memory addresses in the main memory 204. In some examples, a cache line, e.g., a cache line 206a in the cache 206, can be used or specified for the thread. The cache line can include multiple memory addresses 208.

In some cases, the processor 202 can specify different cache lines, e.g., cache lines 206a, 206b, . . . , 206n for different threads, e.g., 202a, 202b, . . . , 202n. In some cases, the processor 202 may specify a same cache line for two sequentially-executed threads, e.g., at different time periods.

Figure 2B:
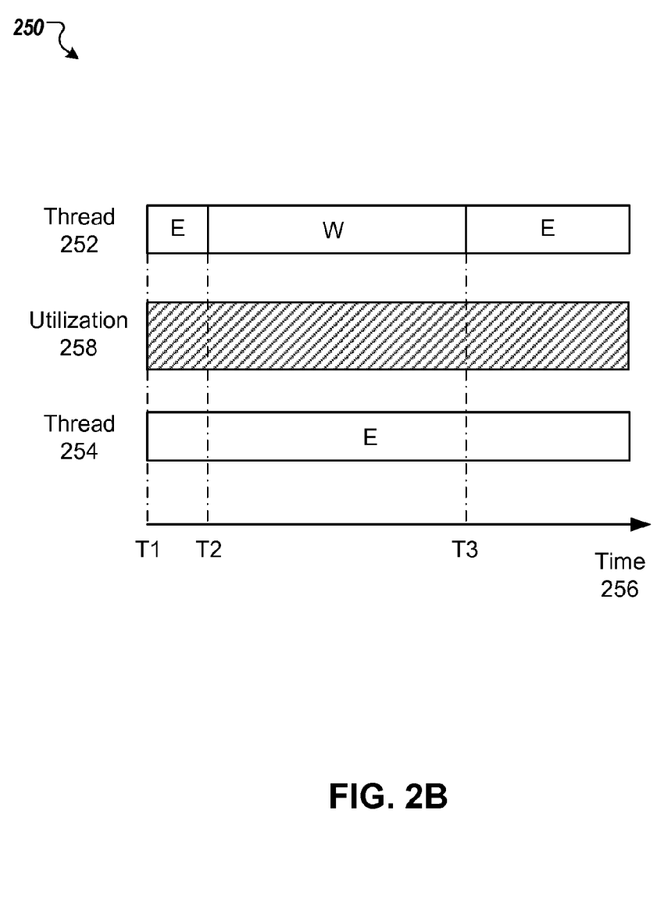
FIG. 2B depicts execution of multiple threads by the multithreaded processing system of FIG. 2A.

FIG. 2B depicts execution of multiple threads in the multithreaded processing system 200 of FIG. 2A. Thread 252 and thread 254 can concurrently execute on the processor 202 along a time line 256. Utilization 258 shows utilization of execution resources of the processor 202. Label "E" of FIG. 2B represents that a thread is executing on the processor 202, and label "W" of FIG. 2B represents that a thread is waiting or in a waiting condition.

Thread 254 is executing on the processor 202. At a time point T1, the processor 202 may execute a task in thread 252 by starting to execute instructions of the task. The execution resources of the processor 202 are utilized to execute the task instructions. At a time point T2, thread 254 may get a higher priority for execution than thread 252. Thread 252 can send a request to the processor 202 to enter into a waiting condition, e.g., by starting an atomic memory transaction with a transactional memory system in the system 200. The transactional memory system can be the transactional memory system 112 of FIG. 1. The processor 202 may specify one or more memory addresses, e.g., one or more cache lines in the cache 206, for the atomic memory transaction to the transactional memory system. In some cases, the specified memory addresses for the transaction may be memory addresses that the thread 252 is interested in. The processor 202 may use the specified memory addresses for executing the thread 252, e.g., remaining instructions in the thread 252. The processor 202 may temporarily cease the task by not proceeding to execute the task executions.

The processor 202 can reallocate the execution resources from thread 252 to thread 254. The processor 202 may execute thread 254 from the time point T2 to a time point T3. During the time period from T2 to T3, thread 252 is in the waiting condition. To minimize contention with thread 254, thread 252 executes low yield instructions in the transaction during the waiting condition, as discussed in detail above.

At the time point T3 or shortly before T3 or at any suitable time point before T3, the processor 202 may receive a signal. In some cases, the system 200, e.g., the transactional memory system of the system 200, monitors a status of the thread 254. At the time point T3, the system 200 may send a signal to the processor 202, e.g., by accessing one of the specified memory addresses for the transaction in the thread 252. In some examples, the system 200 may include other processors, e.g., the processors 108 of FIG. 1. The processors 108 can execute an instruction to access the specified memory address for the transaction. In some cases, the signal may be transmitted from an external system, as discussed in further detail in FIG. 3.

As a consequence of receiving the signal, e.g., a transaction abort signal, the processor 202 may abort the transaction and resume the task in thread 252. The processor 202 may reallocate the execution resources from thread 254 to thread 252. The processor 202 may continue to execute the task instructions in thread 252.

By executing the atomic memory transaction in thread 252, the processor 202 can quickly put thread 252 in a waiting condition, minimize consumption of thread 252 and contention with thread 254 during the waiting period, and quickly reactivate thread 252. The execution resources of the processor 202 can be fully utilized without context switching overheads between thread 252 and thread 254, as illustrated by the utilization 258 in FIG. 2B.

Figure 3:
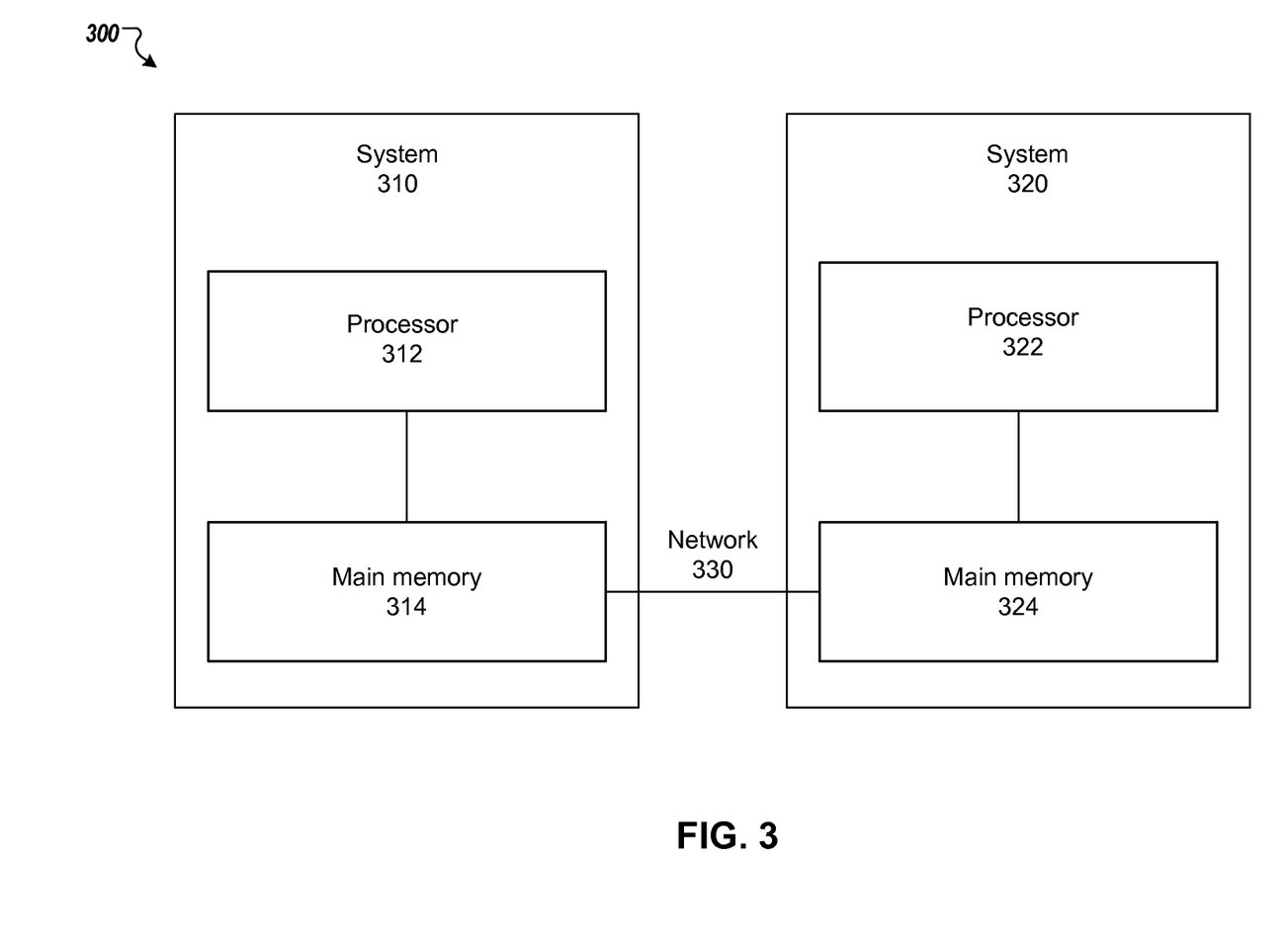
FIG. 3 depicts two processing systems that interact directly through main memories.

FIG. 3 depicts two processing systems 310 and 320 that interact directly through main memories. The processing system 310 includes a processor 312 coupled to a main memory 314. The processing system 320 includes a processor 322 or a non-core device coupled to a main memory 324. In some implementations, the processing system 310, the processor 312, and the main memory 314 can be the multithreaded processing system 100, the processor 102, and the main memory 104 of FIG. 1, respectively.

The processing system 310 communicates with the processing system 320 through a network 330. The network 330 can include any suitable network, e.g., wired or wireless. In some implementations, the processing system 310 and the processing system 320 exchange data in the main memory 314 and the main memory 324 without involving the processors, e.g., the processor 312 and the processor 322, cache, or operating system of either processing system, e.g., by using remote direct memory access (RDMA). In such cases, computing resources in the processing systems 310 and 320 can be freed up. High throughput and performance, e.g., fast data transfer rate, can be achieved.

In some examples, the processor 312 concurrently executes multiple threads. During a waiting period, a waiting thread executes an atomic memory transaction. One or more memory addresses in the main memory 314 are specified for the atomic memory transaction. At a time point during the waiting period, the processing system 320 may read data directly from the main memory 324 and write the data directly to the one or more specified memory addresses for the transaction in the main memory 314, which may generate a signal for the processor 312. As a consequence of receiving the signal, the processor 312 may abort the transaction and resume the waiting thread for execution. In such cases, multithreading execution on the processing system 310 can be remotely controlled, e.g., reactivated, by the processing system 320.

Figure 4:
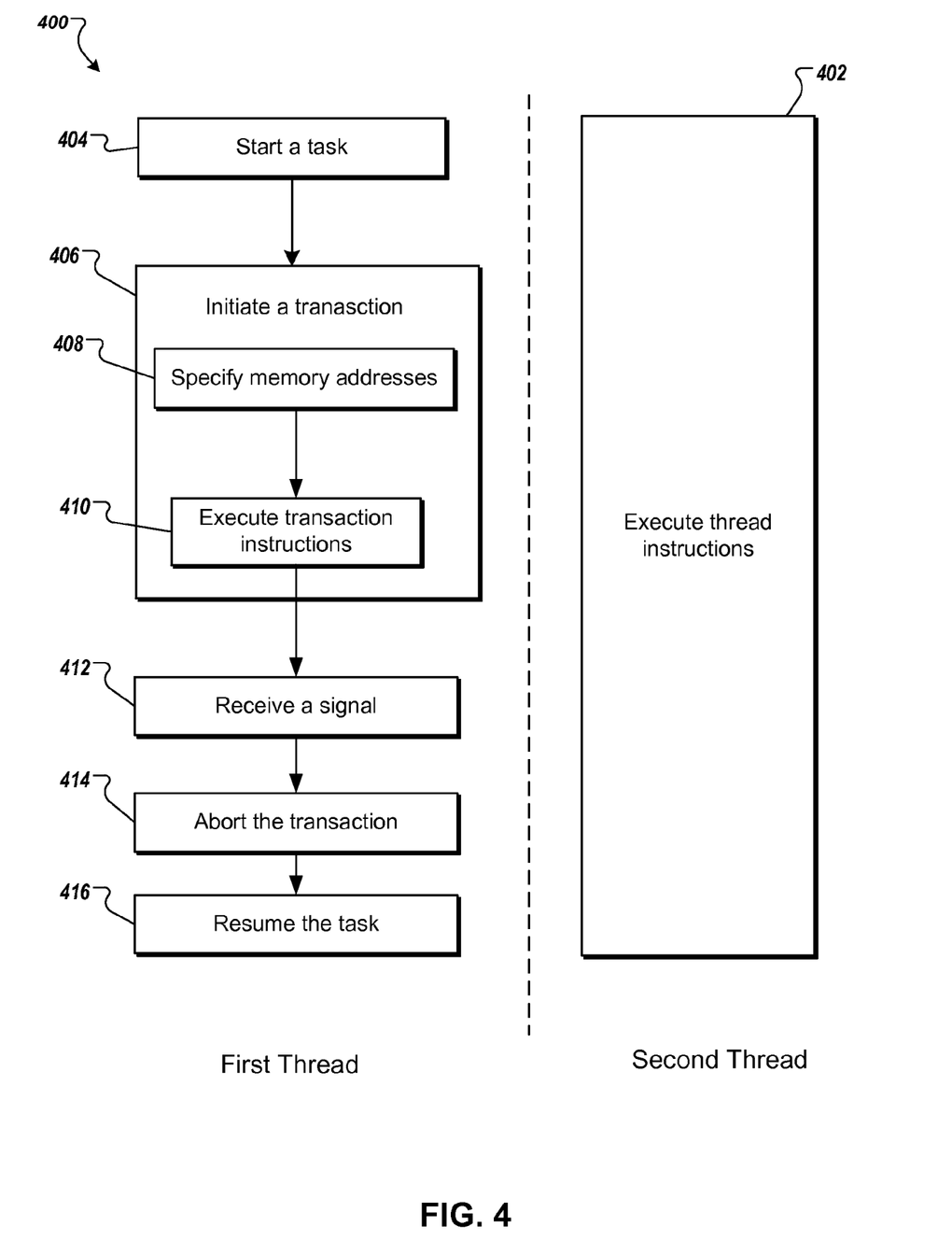
FIG. 4 is a flow chart of an example process performed by a multithreading processing system.

FIG. 4 is a flow chart of an example process performed by a multithreaded processing system. The multithreaded processing system can be the multithreaded processing system 100 of FIG. 1, the system 200 of FIGS. 2A and 2B, or the processing system 310 of FIG. 3. The multithreaded processing system includes a processor, e.g., the processor 102 of FIG. 1, the processor 202 of FIGS. 2A and 2B, or the processor 312 of FIG. 3. The multithreaded processing system may include a transactional memory system, e.g., the transactional memory system 112 of FIG. 1. The processor executes a plurality of threads including a first thread and a second thread.

The second thread is executing on the processor (402). At a first time point, the processor starts a task in the first thread (404). The processor can start to execute a plurality of instructions of the task. At a second time point, the first thread may send a request to the processor to enter into a waiting condition. For example, the second thread may get a higher priority for execution than the first thread at the second time point.

The processor initiates an atomic memory transaction for the first thread (406). The first thread may include instructions or codes to start the atomic memory transaction. The processor may put the first thread in the waiting condition by initiating the atomic memory transaction. The processor may specify one or more memory addresses for the transaction (408), as discussed in detail above. The specified memory addresses may be one or more cache lines in a cache included in the processor and/or one or more corresponding memory addresses or queues in a main memory coupled to the processor.

After specifying the memory addresses for the transaction, the processor executes one or more instructions of the transaction (410). To minimize consumption of execution resources and contention with other concurrent threads on the processor, the transaction instructions are configured to be low yield instructions, as discussed in detail above. At a suitable time point, the processor reallocates execution resources of the processor, e.g., from the first thread to the second thread. The processor can reallocate the execution resources at any suitable time point, e.g., shortly before specifying the memory addresses, immediately after specifying the memory addresses, or shortly after starting execution of the transaction instructions. Reallocation of the execution resource can be dynamic or static. Some resources, e.g., a reorder buffer, are statically partitioned, and may or may not be reallocated during a low-yield state to give room to concurrent threads. Some resources, e.g., arithmetic logic unit (ALU), are dynamically reallocated cycle-by-cycle, and may be not included in the low-yield instructions.

The processor continues executing the second thread. At a third time point after the second time point, the processor receives a signal, e.g., a transaction abort signal (412). The processor may receive the signal from other processors in the same system, e.g., the processors 108 of FIG. 1, or an external processing system, e.g., the processing system 320 of FIG. 3. The signal may be generated as a result that at least one of the memory addresses specified for the transaction is being accessed. As a consequence of receiving the signal, the processor aborts the transaction (414) and resumes the task in the first thread (416). The processor may reallocate the execution resources of the processor to execute the first thread, e.g., until completion of the task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. An apparatus comprising:
a processing core configured to execute a plurality of threads; and
a transactional memory system for executing atomic memory transactions,
wherein the processing core is configured to perform operations including:
starting, by a first thread, a task by starting to execute a plurality of task instructions;
temporarily ceasing the task being executed by the first thread, by not proceeding to execute the task instructions, to initiate an atomic memory transaction;
initiating, by the first thread, the atomic memory transaction using the transactional memory system, including: specifying, to the transactional memory system, a plurality of memory addresses for the atomic memory transaction, including executing a load instruction from each memory address of the plurality of memory addresses;
accessing, by a second thread, a first memory address of the plurality of memory addresses specified for the atomic memory transaction;
receiving, by the first thread, a signal in response to the second thread accessing the first memory address specified for the atomic memory transaction; and
as a consequence of receiving the signal in response to the second thread accessing the first memory address specified for the atomic memory transaction, resuming the task, by the first thread, and continuing to execute the task instructions.

2. The apparatus of claim 1, wherein the plurality of memory addresses correspond to a plurality of cache lines of a cache memory coupled to the processing core.

3. The apparatus of claim 2, the operations further comprising, for each memory address of the plurality of memory addresses, storing a head pointer of a plurality of head pointers at the memory address, each head pointer specifying a respective queue of a plurality of queues, and wherein the signal comprises an update signal for updating a specific head pointer stored in the first memory address.

4. The apparatus of claim 1, further comprising executing one or more instructions in the transaction after specifying the first memory address for the atomic memory transaction, wherein the one or more instructions in the transaction comprise a loop configured to consume very few resources of the processing core for execution.

5. The apparatus of claim 1, wherein temporarily ceasing the task comprises executing a low yield instruction once or repeatedly.

6. The apparatus of claim 5, wherein the low yield instruction comprises one or more of: a memory fence instruction, a no operation (NOP) instruction, or a timestamp checking instruction.

7. The apparatus of claim 1, wherein the transactional memory system comprises a hardware transactional memory (HTM) system configured to interrupt any thread having specified a transaction memory address accessed by a different thread.

8. The apparatus of claim 1, wherein the signal is received from a second, different device executing the second thread, and wherein the processing core and the second device are coupled to a shared memory including the first memory address.

9. The apparatus of claim 1, wherein the processing core is coupled to a first main memory in a first processing system, and the first memory address specifies a memory location in the first main memory, and
wherein receiving a signal comprises receiving the signal from a second, different processing system configured to read data directly from a second, different main memory in the second processing system and write the data directly to the first memory address in the first main memory.

10. A method performed by a multithreaded processing system comprising a processing core and a transactional memory system, comprising:
starting, by a first thread on the processing core, a task by starting to execute a plurality of task instructions;
temporarily ceasing the task being executed by the first thread, by not proceeding to execute the task instructions, to initiate an atomic memory transaction;
initiating, by the first thread, the atomic memory transaction using the transactional memory system, including: specifying, to the transactional memory system, a plurality of memory addresses for the atomic memory transaction, including executing a load instruction from each memory address of the plurality of memory addresses;
accessing, by a second thread, a first memory address of the plurality of memory addresses specified for the atomic memory transaction;
receiving, by the first thread, a signal in response to the second thread accessing the first memory address specified for the atomic memory transaction; and
as a consequence of receiving the signal in response to the second thread accessing the first memory address specified for the atomic memory transaction, resuming the task, by the first thread, and continuing to execute the task instructions.

11. The method of claim 10, wherein the plurality of memory addresses correspond to a plurality of cache lines of a cache memory coupled to the processing core.

12. The method of claim 11, further comprising, for each memory address of the plurality of memory addresses, storing a head pointer of a plurality of head pointers at the memory address, each head pointer specifying a respective queue of a plurality of queues, wherein the signal comprises an update signal for updating a specific head pointer stored in the first memory address.

13. The method of claim 10, further comprising executing one or more instructions in the transaction after specifying the first memory address for the atomic memory transaction, wherein the one or more instructions in the transaction comprise a loop configured to consume very few resources of the processing core for execution.

14. The method of claim 10, wherein temporarily ceasing the task comprises executing a low yield instruction once or repeatedly.

15. The method of claim 14, wherein the low yield instruction comprises one or more of: a memory fence instruction, a no operation (NOP) instruction, or a timestamp checking instruction.

16. The method of claim 10, wherein the transactional memory system comprises a hardware transactional memory (HTM) system configured to interrupt any thread having specified a transaction memory address accessed by a different thread.

17. The method of claim 10, wherein the signal is received from a second, different device executing the second thread, and wherein the processing core and the second device are coupled to a shared memory including the first memory address.

18. The method of claim 10, wherein the processing core is coupled to a first main memory in a first processing system, and the first memory address specifies a memory location in the first main memory, and
wherein receiving a signal comprises receiving the signal from a second, different processing system configured to read data directly from a second, different main memory in the second processing system and write the data directly to the first memory address in the first main memory.

19. A non-transitory computer-readable medium storing instructions that, upon execution by one or more processors, cause the one or more processors to perform operations, comprising:
starting, by a first thread on a processing core, a task by starting to execute a plurality of task instructions;
temporarily ceasing the task being executed by the first thread, by not proceeding to execute the task instructions, to initiate an atomic memory transaction;
initiating, by the first thread, the atomic memory transaction using a transactional memory system, including: specifying, to the transactional memory system, a plurality of memory addresses for the atomic memory transaction, including executing a load instruction from each memory address of the plurality of memory addresses;
accessing, by a second thread, a first memory address of the plurality of memory addresses specified for the atomic memory transaction;

receiving, by the first thread, a signal in response to the second thread accessing the first memory address specified for the atomic memory transaction; and as a consequence of receiving the signal in response to the second thread accessing the first memory address specified for the atomic memory transaction, resuming the task, by the first thread, and continuing to execute the task instructions.

\* \* \* \* \*